E. E. BERRY.
RIVETLESS CHAIN.
APPLICATION FILED APR. 21, 1919.

1,326,171. Patented Dec. 30, 1919.

WITNESS:
Rob. R. Kitchel.

INVENTOR
Earl E. Berry
BY
Frank S. Busser
ATTORNEY.

UNITED STATES PATENT OFFICE.

EARL E. BERRY, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE.

RIVETLESS CHAIN.

1,326,171.        Specification of Letters Patent.      Patented Dec. 30, 1919.

Application filed April 21, 1919. Serial No. 291,611.

*To all whom it may concern:*

Be it known that I, EARL E. BERRY, a citizen of the United States, residing at Kennett Square, county of Chester, and State of Pennsylvania, have invented a new and useful Improvement in Rivetless Chains, of which the following is a full, clear, and exact description, reference being had to the accompanying drawings, which form a part of this specification.

My invention relates to a new and useful improvement in rivetless chains.

The object of my invention is to provide a chain so constructed that it may be readily assembled and disassembled and at the same time so constructed that the pivot joints will be positively locked when the chain is under tension or in working position, thus preventing the links from coming apart.

Referring to the accompanying drawings, wherein I have illustrated a preferred embodiment of my invention,—

The center link is provided with the rounded end portions *a* and the relatively narrow central portion *b*. The central portion is slotted as at *c*, the slots having the relatively narrow extensions *d* in the end portions of the link.

The side links are provided with an end portion *e* and the narrow center *f*. The links are slotted as at *h*, the rib *g* being provided to stiffen the link. The slots have the relatively narrow squared extensions *i* in the end portions of the link. On one side, the ends of the link are provided with the circular depressions *j*, which center in the extensions *i* of the slots *h*.

The pin *k* is circular in section throughout its body portion and terminates in the square heads *l* which are provided with the circular flanges *m*.

In my chain the pin rotates freely in the center link member and is firmly held and prevented from turning in the side link members by the engagement of the squared heads of the pin in the narrow extensions of the slots, while endwise movement is prevented by the engagement of the circular flanges with the depressions *j*.

In order to assemble the chain, it is only necessary to bring the side links to the center of the center link and at right angles to it, so that the wide parts of their slots coincide. Due to the center link being narrower in the center than at its ends, when the side links are pressed together the distance between their outer sides becomes less than the distances between the flanges *m* on the heads *l* of the pin. As the slots *h* at the center of the side links and the slot *c* in the center of the center link are wider than the diameter of the flanges *m* on the heads of the pin, it is only necessary to insert the pin *k* through the three links held in this position and draw the side links down on the pin, engaging the squared heads of the pin in the ends of the links and the circular flanges *m* in the depressions *j*. The side links can then be brought into a straight line with the center link.

The chain may be disassembled by reversing the operations above described.

The chain cannot become disassembled while being used, or until the side links are placed in right-angled relation to the center link, which is impossible when the chain is in operative position, since the wide ends *a* of the center link spread the side links and the pin is held in place through the engagement of its square heads *l* in the extensions *i* and the flanges *m* in the depressions *j*. The pin may be turned by quarter turns in the extensions *i* when it becomes worn, so as to present an unworn surface to the bearing in the center links, thus giving the pin great length of life.

Figure 1:
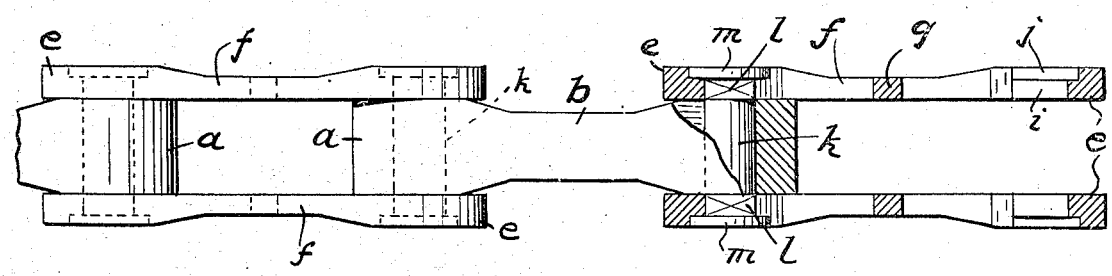
Figure 1 is a plan view, partly in section, of a section of chain.
Figure 2:
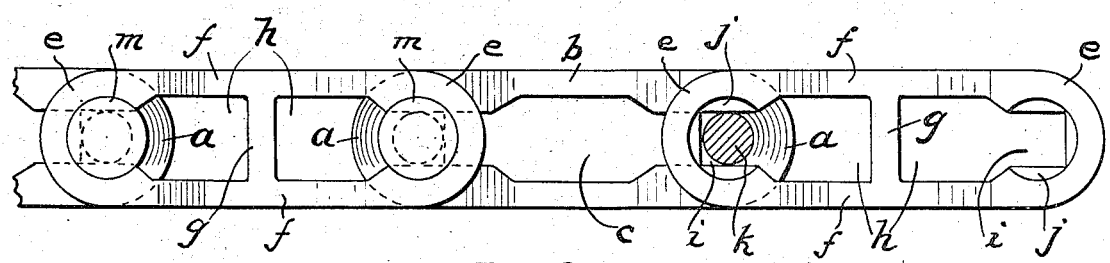
Fig. 2 is a side view of a section of chain.
Figures 3, 4:
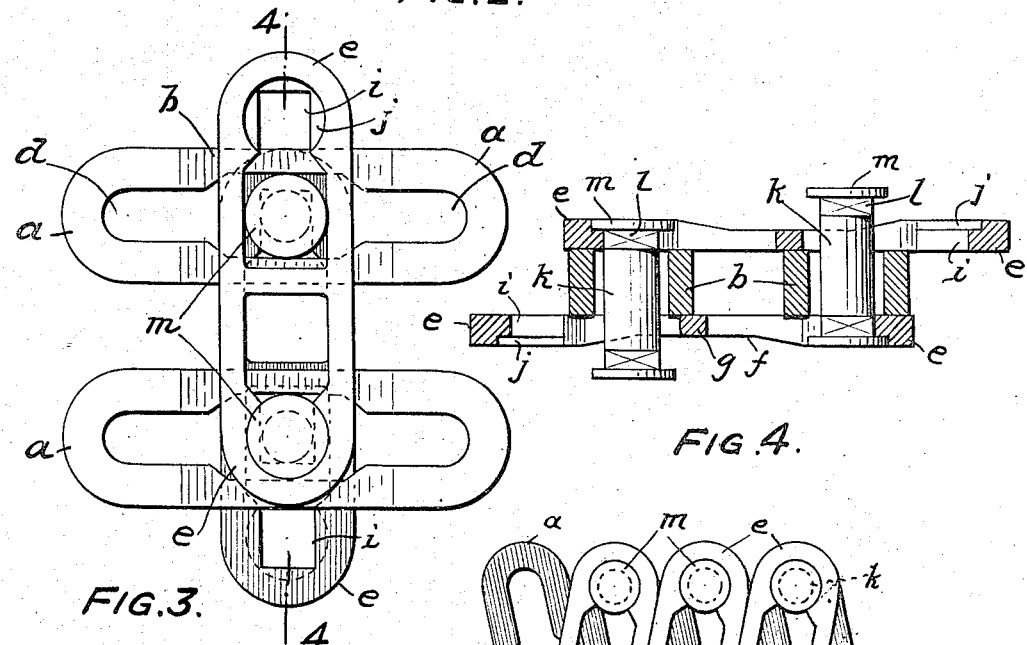
Fig. 3 is a plan view showing position of parts of the chain for assembling.
Fig. 4 is a sectional view on line 4—4 of Fig. 3.
Figure 5:
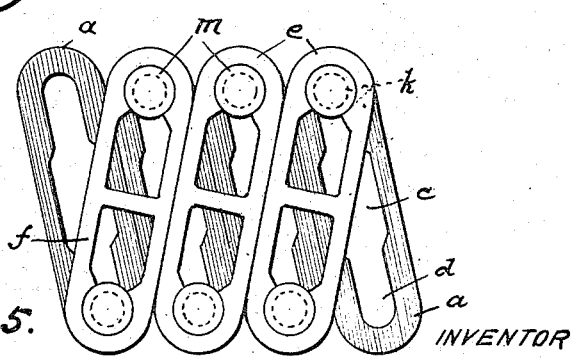
Fig. 5 is a plan view of a section of chain folded for shipment.

The chain may be readily folded as shown in Fig. 5 for shipment or storage.

Having now fully described my invention, what I claim and desire to protect by Letters Patent is:

1. A chain comprising a center link slotted transversely, said slot being wider at its central portion than at its end, side links slotted transversely, said slots being reduced in width adjacent their ends, said side links having depressions in their end portions, and a pin adapted to pass through the central portions of said links and provided with squared heads and flanges adapted to engage the said side links.

2. A chain comprising a center link provided with a slot, said slot being relatively wide in the central portion and having rounded ends, side links provided with slots relatively wide in the central portion and having squared ends, said side links having depressions in their sides coincident with the squared ends of said slots, and a pin having squared heads and provided with flanges adjacent said heads adapted to engage with the squared ends of said slots and with said depressions in the side links to prevent turning and endwise movement of the pin respectively.

3. A chain comprising a center link having relatively wide end portions and provided with a slot tapering toward its ends, side links having relatively wide end portions and provided with slots tapering toward their ends and terminating in a squared portion, said side links having depressions in their end portions, and a pin adapted to engage said squared portion and provided with flanged ends adapted to engage in said depressions to lock the pin in position.

4. A chain comprising a center link having a relatively narrow body portion and relatively wide ends, there being a slot in said link, said slot having rounded ends, side links, provided with slots having relatively narrow squared extensions in their end portions, and having depressions along the outer edges of said extensions, and a pin having a cylindrical body portion and squared heads, said heads terminating in circular flanges adapted to fixedly engage in said side links.

5. A chain comprising a center link and side links, there being slots in said links having relatively narrow end portions, said side links having depressions in their sides along the edges of said slots, and a pin having square heads terminating in circular flanges and adapted to pivotally tie said links together, said square heads engaging in the slots in said side links to prevent the pin from turning and said flanges engaging in the depressions to prevent endwise movement of the pin.

6. A chain comprising a center link having relatively wide ends and being slotted transversely, said slot terminating in relatively narrow extensions, side links having depressions adjacent their ends and slotted transversely, said slots terminating in relatively narrow squared extensions, and a pin having a cylindrical body portion terminating in squared heads, each of said heads being provided, on its end, with a flange, whereby said pin will be prevented from turning and from endwise movement.

7. A chain comprising a center link having a relatively narrow body portion and relatively wide ends, and provided with a slot having a relatively wide body portion and relatively narrow ends, side links each end of which has a depression, each side link having a slot whose end is of reduced width, the reduced end of the slot having parallel walls adjacent a depression, and removable pins each of whose ends is provided with members respectively engageable with one of the depressions and the reduced end of the slot adjacent thereto.

In testimony of which invention, I have hereunto set my hand, at Kennett Square, Pa., on this 4th day of April, 1919.

EARL E. BERRY.